Dec. 5, 1933.  A. WICK  1,938,091
NEW HELICOPTER
Filed Aug. 22, 1930  4 Sheets-Sheet 1
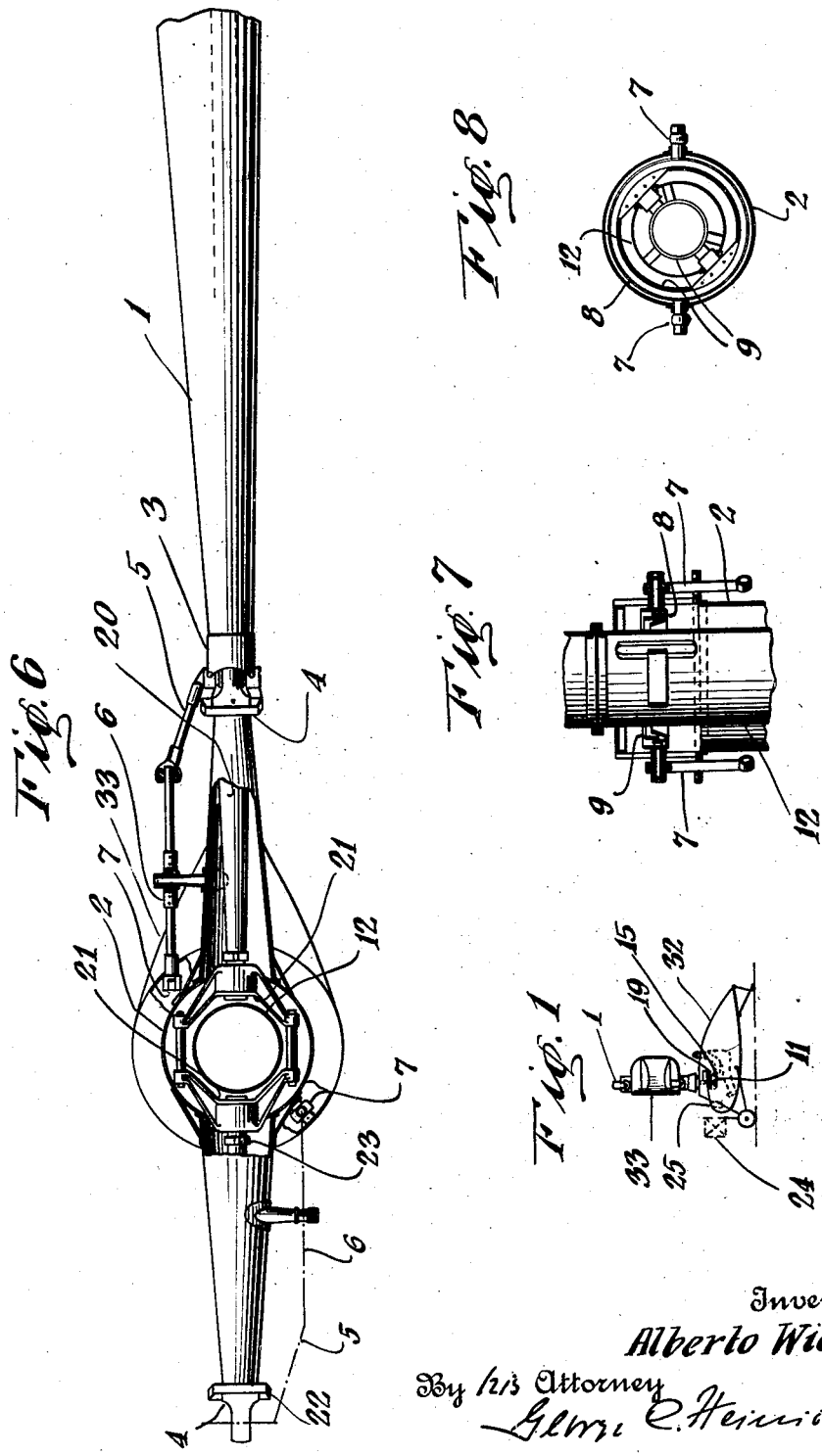
Inventor
Alberto Wick
By his Attorney Dec. 5, 1933.  A. WICK  1,938,091
NEW HELICOPTER
Filed Aug. 22, 1930    4 Sheets-Sheet 2
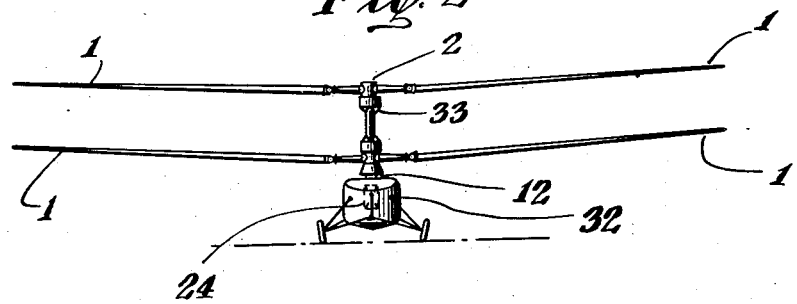
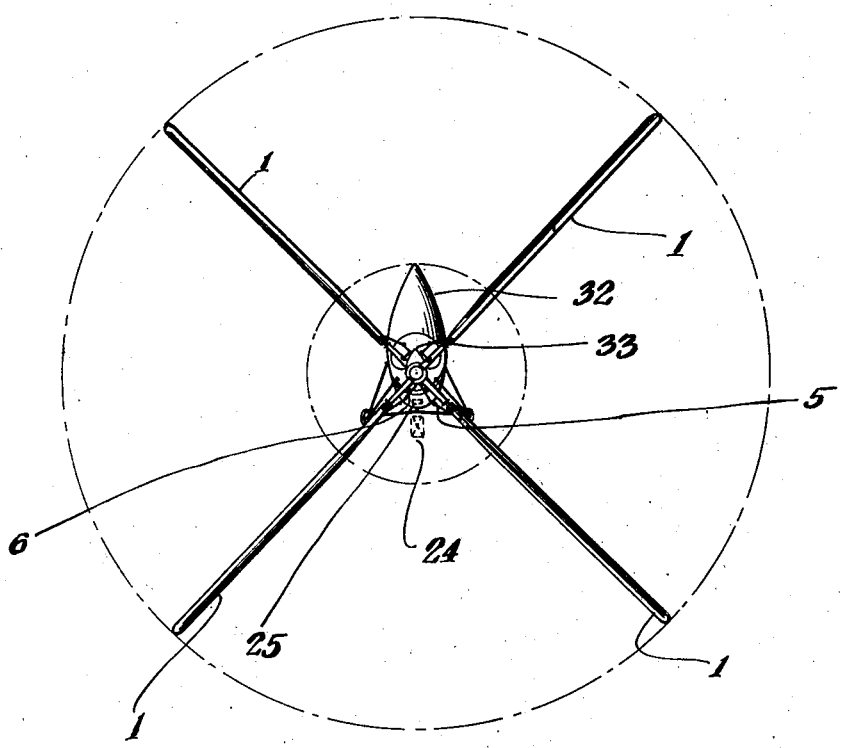
Inventor
Alberto Wick
By his Attorney

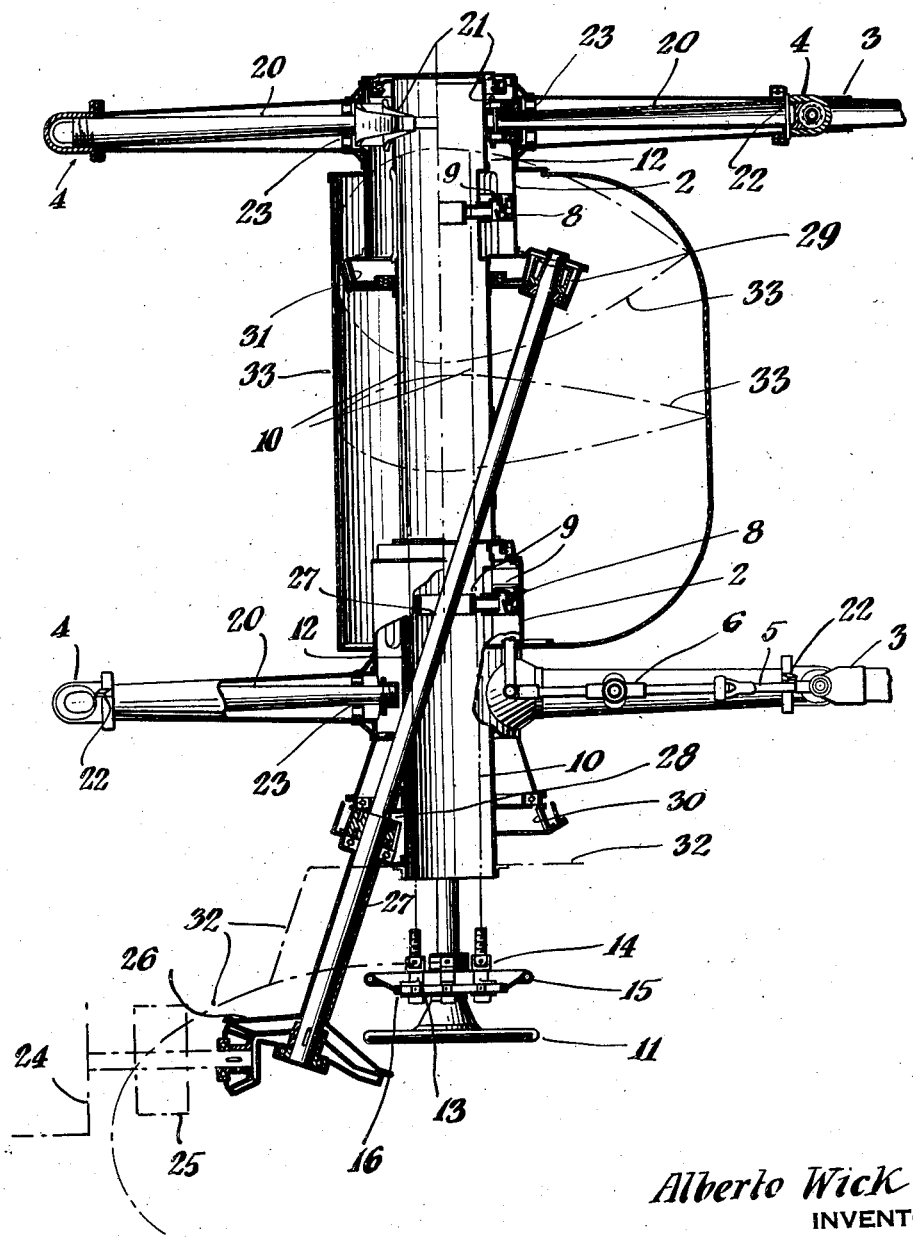

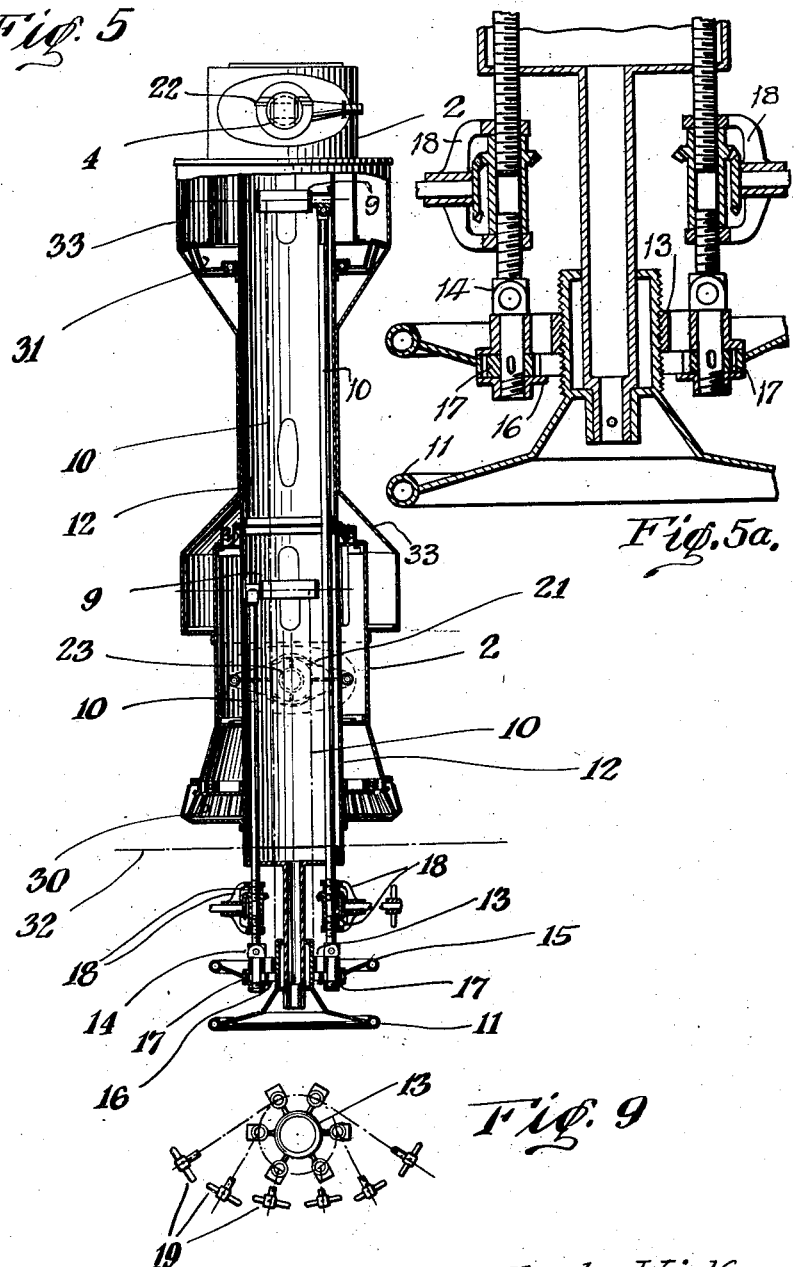

Patented Dec. 5, 1933

1,938,091

UNITED STATES PATENT OFFICE 1,938,091

NEW HELICOPTER

Alberto Wick, Buenos Aires, Argentina

Application August 22, 1930. Serial No. 476,981

2 Claims. (Cl. 244—19)

This invention refers to a helicopter with the following characteristics: The blades of the carrying airscrews, fixed in a flexible joint in the arms of the cylindrical hub of the airscrews, can oscillate freely within the limits required by the construction of the helicopter, so that the longitudinal axis of the blades can take the position corresponding to the resultant of the aerodynamical and centrifugal forces produced by the blades and so eliminate the flection stresses which would be produced in airscrews with rigid fixed blades and so to be able to make the blades with profiles affording a minimum resistance to the penetration, also the incidence of the blades can be varied at will within the limits required by the construction of the helicopter, as follows: (1) Increased or decreased on both airscrews to change and regulate the vertical velocity of the helicopter and in case of landing in gliding flight to increase the incidence just before landing so that the inertia of the airscrews will permit landing with a vertical velocity near zero. (2) Increased in any one of the two airscrews and decreased in the other for horizontal change of direction or turning of the helicopter due to the changes of the tangential reaction (torque) of the two airscrews which turn in opposite direction to each other. (3) Increased in each airscrew at any point of the described circle and decreased in the opposite side varying progressively for giving the most appropriate and efficient incidences to the blades in every point of their path, to change and regulate the horizontal velocity of the helicopter, owing to the change of position and direction of the carrying forces (thrust) of the two airscrews, so that the circle described by the blades in each airscrew takes the necessary inclination to obtain a horizontal component of the carrying force (thrust) suitable to the horizontal velocity and direction wanted in the helicopter. (4) The blades of the airscrews also vary their incidence when changing their position relatively to the axis of same, decreasing the incidence when the blades rise and increasing if they sink; in case that the forces of equilibrium produced in the blades are varied due to increase or decrease of the aerodynamical forces produced in the same, by an increase of the aerodynamical force the blades are raised and the incidence reduced and with a decrease of same the blades sink and the incidence is increased. This fact always makes the blades keep or accommodate themselves to the equilibrium position determined by the controlling apparatus and make this helicopter to a given extent "fool proof" even when the motor stops, as in this case owing to the lack of motive power the airscrews would gradually reduce their velocity consuming part of the inertia, but with the velocity, the centrifugal force also decreases and the blades rise also reducing the incidence of same until a new velocity of equilibrium is reached by the airscrews with a little negative incidence of the blades which will keep the airscrews turning and the helicopter always keeping its stability will go over to a gliding flight in a vertical or inclined path, depending on the variation of the incidence of the blades in the circle they describe and which can be established as desired.

As an example in the accompanying drawings is shown a helicopter studied with the characteristics before mentioned with two coaxial airscrews and which with a 50 H. P. motor would weigh 300 kilogrammes and have a carrying power (thrust) of 500 kilogrammes leaving a useful load of 200 kilogrammes, enough to carry two persons and fuel for many hours flight, the vertical ascending velocity would be up to 4 meters per second and the horizontal velocity up to 120 kilometers per hour. The stability of this helicopter is absolute in every sense, owing to the fact that the flexible joints for fixing the blades are at a given distance from the axis of the airscrews and also on account of the gyroscopic effect of each airscrew which can act freely owing to the fact that the blades of same are fixed with flexible joints and can oscillate in every direction within the required limits.

Reference is made to the accompanying drawings wherein:

Fig. 1 is a side view of the helicopter;

Fig. 2 is a front view of the helicopter;

Fig. 3 is a plan view of the helicopter;

Fig. 4 is a longitudinal cross section view showing the entirety of the construction of the mechanisms with some of the parts figuring in front view;

Fig. 5 is a cross section view showing the entirety of the construction of the mechanisms with some of the parts figuring in front view;

Fig. 5a is an enlarged detail view of the hand wheels and adjusting mechanism, partly in section.

Fig. 6 is a horizontal cross section view of the hub, arms and top blade with some of the parts figuring in front view;

Fig. 7 is a cross section view showing the roller bearing between parts 8 and 9 and the connecting rods 7.

Fig. 8 is a plan view indicating the roller bearing between parts 8 and 9 and connecting rods 7.

Fig. 9 is a plan view showing part 13 and position of the cross-wheels 19.

The blades (1) secured to the arms of the cylindrical hub (2) of the airscrews by a universal joint of standard construction, designated (3, 4) and provided with a crank arm (5) to change or fix the incidence of the blades, the extreme of this crank arm (5) is connected with a flexible sliding joint to one end of the balancing rod (6) with its other end flexibly connected through the tubular bar (7) to trunnions of the respective ring (8) which is carried by the hubs (2) and turns on ball bearing on the piece ring (9) guided in the tubular support (12), the position of this piece ring (9) which is fixed by the apparatus of control establishes the incidence required in the blades. Each of the pieces (9) is connected through three connecting tubular rods (10) to the apparatus of control which is formed by the height controlling handwheel (11) fixed in rotary fashion in the base of the tubular support (12) and carries in its cylindrical screwed part the plate (13) in which are fixed six rotary pieces (14) with flexible joints with screwed ends to be connected to the rods (10), the rotary pieces (14) are operated by the turning or direction handwheel (15) which carries a toothed ring (16) that works in the cylindrical pinions (17) of the pieces (14), the union of the rods (10) to the rotary pieces (14) is formed by the pieces (18) for controlling the horizontal velocity of the helicopter, made of six tubular pieces screwed in the interior of both ends, one end left hand and the other right hand and with an angular toothed wheel which gears in a similar toothed wheel which is operated by the cross wheels (19). The flexible joints (4) of the airscrew are connected together to take the centrifugal force of the blades through the tubular bars (20) which in the ends that cross the hubs are united together by two bracket pieces (21) which pass around the tubular support (12), the union of the piece (21) to the tubular bars (20) is formed by a traction ballbearing to reduce the friction produced by the centrifugal force when increasing or decreasing the incidence of the blades. The flexible joints (4) have the butts (22) in which lean the two noses of the fork pieces (3) of the blades to keep the same in position when the helicopter is at rest as well as when the airscrews are put in motion. In the arms of the airscrews near the hub are fixed the annular supports (23) which keep in position the tubular bars (20).

The motive power is produced by a suitable motor (24) connected with a clutch (25) to the gear box (26) which drives the axle (27) with the conical toothed wheels (28) and (29) which drive the respective toothed rings (30) and (31) of each airscrew that turns on ball bearings fixed in the tubular support (12). This support is also fixed on the scull or cabin (32) with the landing device which can also be provided with floats for descending on water.

The controlling operations are as follows:

The height controlling hand wheel 11 is mounted on the lower reduced portion of the tubular support 12, which carries also a part 13 provided with a thread to allow its up and down movement to rotate tube 12 in one or the other direction and its connection with crank arms 5 of the blades by the intermediary of ring 9, ring 8 on the hubs 2 bar 7 and rod 6 controls the angle of incidence of the blades.

The handwheel 15 carries a thin toothed ring 16 in mesh with the pinions 17 on the pieces 14 on part 13 in which the rods 10 are screwed.

The rotary pieces 14 are arranged in two groups, the screws of which have threads running in opposite directions and through their connection with the crank arms 5 of one airscrew will move in one direction while the crank arms of the other airscrew will move in the opposite direction.

Thus, the operation of the hand wheel 15 will produce a turning of one air screw in one direction and of the other in the opposite direction or vice versa in order to change direction or turning of the helicopter.

Turning the altitude handwheel (11) in one direction or in the other, the incidence of all the blades is increased or decreased, owing to the fact that part (13) rises or sinks and transmits the movement to the crank arms (5) of the blades; turning the direction handwheel (15) in one direction or in the other the incidence of the blades of any one of the airscrews can be increased and decreased in the other, due to the fact that the three parts (14) corresponding to one airscrew have right hand screwed ends and the three pieces corresponding to the other airscrew have left hand screwed ends, consequently the crank arms (5) of one airscrew move in one direction and that of the other airscrew in the opposite direction. Operating the cross wheels (19), as each rod (10) can be lengthened or shortened, we obtain the desired inclination of the piece ring (9), amplitude and direction must be determined experimentally so as to obtain the desired horizontal speed of the helicopter with the minimum motive power. Decreasing of the incidence of the blade when this rises and increasing when the same sinks is due to the fact that the end of the crank arm (5) is connected to the one extreme of the balancing rod (6) the position of which is fixed by the control apparatus.

The parts between both airscrews and which are of cylindrical section, in order to improve the stability, have a cover (33) in stream line form to also reduce the resistance of penetration and so obtain higher horizontal speed in the helicopter.

I claim:

1. In a helicopter a pair of superposed propellers each having two parts jointed by a universal joint, a crank arm attached to each propeller blade, a vertically disposed tubular support for the propellers, having a reduced end portion and a hand wheel on the reduced end of said tube to raise and lower the same, connections between said hand wheel and said crank arms to change the angle of incidence of the propeller blades, and another hand wheel and connections between the same and the propellers to control the rotary motion of the same.

2. In a helicopter, two superposed propellers, turning in opposite directions, each having its blades in two parts, universal joints connecting the two parts of each propeller blade, a crank arm for each propeller blade, a tubular support for said propellers having a reduced end portion and a hand wheel having a hub on a reduced portion of said support, a threaded sleeve on said hub, connections between said sleeve and the crank arm to adjust the tilting of the blades at an angle to the horizontal, and another hand wheel and connections between said second hand wheel and said propellers to adjust the propellers to accommodate the same to the prevailing conditions at the start, said propeller blades accommodating themselves during the flight to maintain the stability of the plane.

ALBERTO WICK.